United States Patent
Ożóg et al.

(10) Patent No.: US 12,416,247 B2
(45) Date of Patent: Sep. 16, 2025

(54) FLEXIBLE SUPPORT FOR AIRCRAFT MOTOR BEARING

(71) Applicant: Pratt & Whitney Canada Corp., Longueuil (CA)

(72) Inventors: Mateusz Ożóg, Hucisko (PL); Richard Ivakitch, Scarborough (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/423,675

(22) Filed: Jan. 26, 2024

(65) Prior Publication Data

US 2025/0243782 A1    Jul. 31, 2025

(51) Int. Cl.
F01D 25/16    (2006.01)

(52) U.S. Cl.
CPC ........ F01D 25/164 (2013.01); *F05D 2240/50* (2013.01)

(58) Field of Classification Search
CPC ...... F01D 25/164; F01D 25/162; F01D 25/16; F16F 1/3732; F16F 1/324; F16C 27/04; F16C 27/045
See application file for complete search history.

(56) References Cited

U.S. PATENT DOCUMENTS

| | | | |
|---|---|---|---|
| 4,496,252 A | 1/1985 | Horler | |
| 4,655,614 A * | 4/1987 | Schott | F16C 27/04 384/441 |
| 4,952,076 A | 8/1990 | Wiley, III | |
| 5,421,655 A * | 6/1995 | Ide | F16C 27/02 384/99 |
| 8,337,090 B2 | 12/2012 | Herborth | |
| 9,926,975 B2 | 3/2018 | Smedresman | |
| 10,450,893 B1 | 10/2019 | Polly | |
| 11,021,998 B2 | 6/2021 | Ganiger | |
| 11,105,223 B2 | 8/2021 | Ganiger | |
| 11,193,390 B2 | 12/2021 | Ganiger | |
| 11,674,397 B2 | 6/2023 | Ganiger | |
| 2010/0220948 A1 | 9/2010 | Singh | |
| 2012/0213629 A1 * | 8/2012 | Rouesne | F16C 27/045 415/170.1 |

(Continued)

OTHER PUBLICATIONS

EP Search Report for EP Patent Application No. 25154179.3 dated Jun. 27, 2025.

*Primary Examiner* — Topaz L. Elliott
(74) *Attorney, Agent, or Firm* — Getz Balich LLC

(57) ABSTRACT

An assembly is provided for an aircraft motor. This assembly includes a bearing, a stationary structure and a flexible support. The bearing extends circumferentially around an axis. The stationary structure circumscribes the bearing. The flexible support is arranged radially between and radially engages the bearing and the stationary structure. The flexible support includes a first ring, a second ring, a plurality of bridges and a plurality of first ribs. The bridges are arranged circumferentially about the axis. Each of the bridges extends radially between and is connected to the first ring and the second ring. The first ribs are arranged circumferentially about the axis and interspersed with the bridges. Each of the first ribs projects radially out from the first ring towards the second ring. Each of the first ribs is connected to the first ring and is disengaged from the second ring.

17 Claims, 7 Drawing Sheets

(56) References Cited

U.S. PATENT DOCUMENTS

| | | | |
|---|---|---|---|
| 2014/0119912 A1* | 5/2014 | Bidkar | F01D 11/025 |
| | | | 277/412 |
| 2016/0097424 A1* | 4/2016 | Hafermalz | F16C 27/04 |
| | | | 384/535 |
| 2017/0145855 A1* | 5/2017 | Ganiger | F16C 35/067 |
| 2017/0276173 A1* | 9/2017 | Smedresman | F16F 15/022 |
| 2017/0350270 A1* | 12/2017 | Feldmann | F01D 11/08 |
| 2019/0211708 A1* | 7/2019 | Kempinger | F01D 25/243 |
| 2019/0353051 A1* | 11/2019 | Ganiger | F01D 25/164 |
| 2019/0383299 A1* | 12/2019 | Lucchetta | F04D 29/059 |

\* cited by examiner

FLEXIBLE SUPPORT FOR AIRCRAFT MOTOR BEARING

TECHNICAL FIELD

This disclosure relates generally to an aircraft motor and, more particularly, to a bearing support member for use within the aircraft motor.

BACKGROUND INFORMATION

An aircraft motor such as a gas turbine motor may include a flexible bearing support to accommodate slight radial shifts between a rotating structure and a stationary structure of the aircraft motor. Various types and configurations of flexible bearing supports are known in the art. While these known flexible bearing supports have various benefits, there is still room in the art for improvement.

SUMMARY

According to an aspect of the present disclosure, an assembly is provided for an aircraft motor. This assembly includes a bearing, a stationary structure and a flexible support. The bearing extends circumferentially around an axis. The stationary structure circumscribes the bearing. The flexible support is arranged radially between and radially engages the bearing and the stationary structure. The flexible support includes a first ring, a second ring, a plurality of bridges and a plurality of first ribs. The bridges are arranged circumferentially about the axis. Each of the bridges extends radially between and is connected to the first ring and the second ring. The first ribs are arranged circumferentially about the axis and interspersed with the bridges. Each of the first ribs projects radially out from the first ring towards the second ring. Each of the first ribs is connected to the first ring and is disengaged from the second ring.

According to another aspect of the present disclosure, another assembly is provided for an aircraft motor. This assembly includes a bearing, a stationary structure and a flexible support. The bearing extends circumferentially around an axis. The stationary structure circumscribes the bearing. The flexible support is arranged radially between the bearing and the stationary structure. The flexible support includes a first ring, a second ring, a plurality of bridges and a plurality of first ribs. One of the first ring and the second ring radially engages the bearing. The other one of the first ring and the second ring radially engages the stationary structure. The bridges are arranged circumferentially about the axis. Each of the bridges extend radially between and is connected to the first ring and the second ring. The first ribs are arranged circumferentially about the axis and are interspersed with the bridges. Each of the first ribs projects radially out from the first ring towards the second ring. Each of the first ribs is connected to the first ring and is disengaged from the second ring.

According to still another aspect of the present disclosure, an apparatus is provided for an aircraft motor. This apparatus includes a flexible support for a bearing in the aircraft motor. The flexible support includes a plurality of members extending axially along an axis from a first side of the flexible support to a second side of the flexible support. The members include a first ring, a second ring, a plurality of first bridges and a plurality of first ribs. The first ring extends circumferentially around the axis. The second ring extends circumferentially around the axis. The first bridges are arranged circumferentially about the axis. Each of the first bridges projects radially from the first ring to the second ring. The first ribs are arranged circumferentially about the axis and interspersed with the first bridges. Each of the first ribs projects radially out from the first ring, in a direction towards the second ring, to a respective unsupported first rib distal end. A plurality of first ports extend axially through the flexible support from the first side of the flexible support to the second side of the flexible support. Each of the first ports extends radially within the flexible support from the first ring to the second ring. Each of the first ports extends circumferentially within the flexible support between a respective one of the first bridges and a respective one of the first ribs.

The members may also include a third ring, a plurality of second bridges and a plurality of second ribs. The third ring may extend circumferentially around the axis with the second ring radially between the first ring and the third ring. The second bridges may be arranged circumferentially about the axis. Each of the second bridges may project radially from the second ring to the third ring. The second ribs may be arranged circumferentially about the axis and interspersed with the plurality of second bridges. Each of the second ribs may project radially out from the second ring, in a direction towards the third ring, to a respective unsupported second rib distal end.

A plurality of second ports may extend axially through the flexible support from the first side of the flexible support to the second side of the flexible support. Each of the second ports may extend radially within the flexible support from the second ring to the third ring. Each of the second ports may extend circumferentially within the flexible support between a respective one of the second bridges and a respective one of the second ribs.

The first ring may be an inner ring. The second ring may be an outer ring which circumscribes the inner ring.

The second ring may be an inner ring. The first ring may be an outer ring which circumscribes the inner ring.

The flexible support may also include a plurality of second ribs. Each of the second ribs may be connected to and project radially out from the second ring. Each of the second ribs may be circumferentially aligned with a respective one of the first ribs. Each of the second ribs may be separated from the respective one of the first ribs by a respective radial gap.

A first of the first ribs may be circumferentially aligned with a first of the second ribs. A radial height of the first of the first ribs may be equal to a radial height of the first of the second ribs.

A first of the first ribs may be circumferentially aligned with a first of the second ribs. A radial height of the respective radial gap radially between and formed by the first of the first ribs and the first of the second ribs may be less than a radial height of the first of the first ribs and/or a radial height of the first of the second ribs.

A first of the first ribs may be circumferentially aligned with a first of the second ribs. A radial height of the respective radial gap radially between and formed by the first of the first ribs and the first of the second ribs may be less than a lateral thickness of the first of the first ribs and/or a lateral thickness of the first of the second ribs.

Each of the first ribs may be separated from the second ring by a respective radial gap.

A radial height of the respective radial gap radially between and formed by a first of the first ribs and the second ring may be less than: a radial height of the first of the first ribs; and/or a lateral thickness of the first of the first ribs.

A radial height of a first of the bridges may be: equal to or less than a lateral width of the first of the bridges; and/or greater than an axial width of the first of the bridges.

A radial height of a first of the bridges may be greater than a radial thickness of the first ring and/or a radial thickness of the second ring.

The flexible support may extend axially between a support first side and a support second side. The first ring, the second ring, each of the bridges and each of the first ribs may project axially to the support first side. In addition or alternatively, the first ring, the second ring, each of the bridges and each of the first ribs may project axially to the support second side.

The bearing may be configured as or otherwise include a rolling element bearing with an outer race. One of the first ring or the second ring may circumscribe and radially engage the outer race.

One of the first ring or the second ring may circumscribe and may radially contact the bearing.

The stationary structure may circumscribe and may radially contact one of the first ring or the second ring.

The flexible support may be attached to the stationary structure through an interference fit at a radial interface between the stationary structure and one of the first ring or the second ring.

The flexible support may be attached to the stationary structure through a bonded connection between the stationary structure and one of the first ring or the second ring.

The flexible support may be attached to the stationary structure with one or more fasteners.

The bridges may be a plurality of first bridges, and the flexible support may also include a third ring, a plurality of second bridges and a plurality of second ribs. The second ring may be radially between the first ring and the third ring. The second bridges may be arranged circumferentially about the axis. Each of the second bridges may extend radially between and may be connected to the second ring and the third ring. The second bridges may be circumferentially offset from the first bridges. The second ribs may be arranged circumferentially about the axis and interspersed with the second bridges. Each of the second ribs may project radially out from the second ring towards the third ring. Each of the second ribs may be connected to the second ring and may be disengaged from the third ring.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
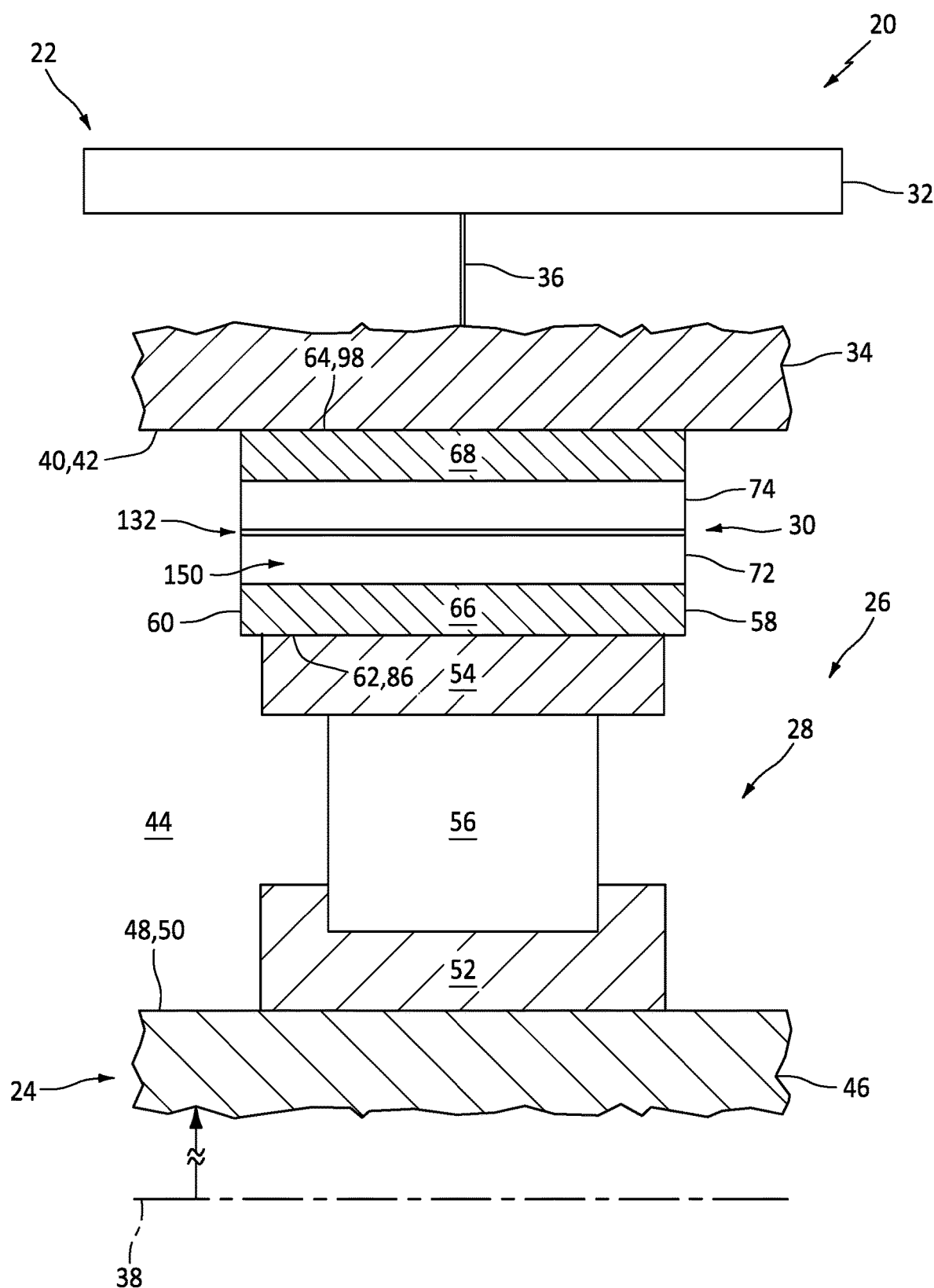
FIG. 1 is a sectional illustration of a portion of an assembly for an aircraft motor.

FIG. 1 illustrates an assembly 20 for a motor of an aircraft. The aircraft may be an airplane, a helicopter, a drone (e.g., an unmanned aerial vehicle (UAV)) or any other manned or unmanned aerial vehicle or system. The aircraft motor may be configured as, or otherwise included as part of, a propulsion system for the aircraft. The aircraft motor may also or alternatively be configured as, or otherwise included as part of, an electrical power system for the aircraft. The motor assembly 20 of FIG. 1 includes a stationary structure 22 of the aircraft motor and a rotating structure 24 of the aircraft motor. This motor assembly 20 also includes a mounting assembly 26 for rotatably mounting the rotating structure 24 to the stationary structure 22. The mounting assembly 26 of FIG. 1 includes a bearing 28 and a flexible support 30 for the bearing 28; e.g., a flexible bearing support.

The stationary structure 22 may be configured as, or otherwise included as part of, a casing structure of the aircraft motor. The stationary structure 22 of FIG. 1, for example, includes a motor case 32, a stationary outer mounting land 34 and a land support 36 (e.g., an annular frame, an array of struts, etc.) extending radially between and structurally tying the outer mounting land 34 to the motor case 32, where the motor case 32 and the land support 36 are schematically shown. The outer mounting land 34 extends axially along an axis 38. Briefly, this axis 38 may be a centerline axis of the aircraft motor and/or one or more of its members 22, 24, 26, 28 and/or 30. The axis 38 may also or alternatively be a rotational axis of the rotating structure 24. The outer mounting land 34 projects radially inward (towards the axis 38) to a radial inner side 40 of the outer mounting land 34. The outer mounting land 34 extends circumferentially about (e.g., completely around) the axis 38, which provides the outer mounting land 34 with, for example, a full-hoop (e.g., tubular or annular) geometry.

The outer mounting land 34 of FIG. 1 includes an interior land surface 42 disposed at the land inner side 40. This interior land surface 42 may have a regular cylindrical geometry. The land inner side 40 and its interior land surface 42 partially or completely form a radial outer peripheral boundary of an internal bore 44 in the stationary structure 22 and its outer mounting land 34. This land bore 44 extends axially along the axis 38 in (e.g., into, within or through) the stationary structure 22 and its outer mounting land 34.

The rotating structure 24 may be configured as, other otherwise included as part of, a spool or other rotating assembly of the aircraft motor. The rotating structure 24 of FIG. 1, for example, includes an inner mounting land 46 extending axially in the land bore 44. This inner mounting land 46 may be part (e.g., an axial section) of a motor shaft. The inner mounting land 46 may alternatively be configured as, or otherwise included as part of, another component mounted onto or formed integral with the motor shaft; e.g., a shaft sleeve, a rotor disk, etc. The inner mounting land 46 extends axially along the axis 38. The inner mounting land 46 projects radially outward (away from the axis 38) to a radial outer side 48 of the inner mounting land 46. The inner mounting land 46 extends circumferentially about (e.g., completely around) the axis 38, which provides the inner mounting land 46 with, for example, a full-hoop (e.g., tubular or annular) geometry.

The inner mounting land 46 of FIG. 1 includes an exterior land surface 50 disposed at the land outer side 48. The exterior land surface 50 may have a regular cylindrical geometry.

The bearing 28 may be configured as a rolling element bearing. The bearing 28 of FIG. 1, for example, includes a bearing inner race 52, a bearing outer race 54 and a plurality of bearing rolling elements 56 arranged circumferentially about the axis 38 in an array; e.g., a circular array. The inner race 52 extends axially along and circumferentially about (e.g., circumscribes) the inner mounting land 46 and the axis 38. This inner race 52 is mounted onto (e.g., fixed to) and is rotatable with the rotating structure 24 and its inner mounting land 46. The outer race 54 is spaced radially outboard from the inner race 52. The outer race 54 extends axially along and circumferentially about (e.g., circumscribes) the inner race 52, the array of rolling elements 56 and the axis 38. The array of rolling elements 56 are arranged radially between the inner race 52 and the outer race 54, where each of the rolling elements 56 is operable to radially engage and roll against the inner race 52 and the outer race 54. The present disclosure, however, is not limited to such an exemplary rolling element bearing configuration. Moreover, while the bearing 28 is described above as the rolling element bearing, it is contemplated the bearing 28 may alternatively be configured as a journal bearing or any other type of bearing suitable for use in the aircraft motor.

Figure 2:
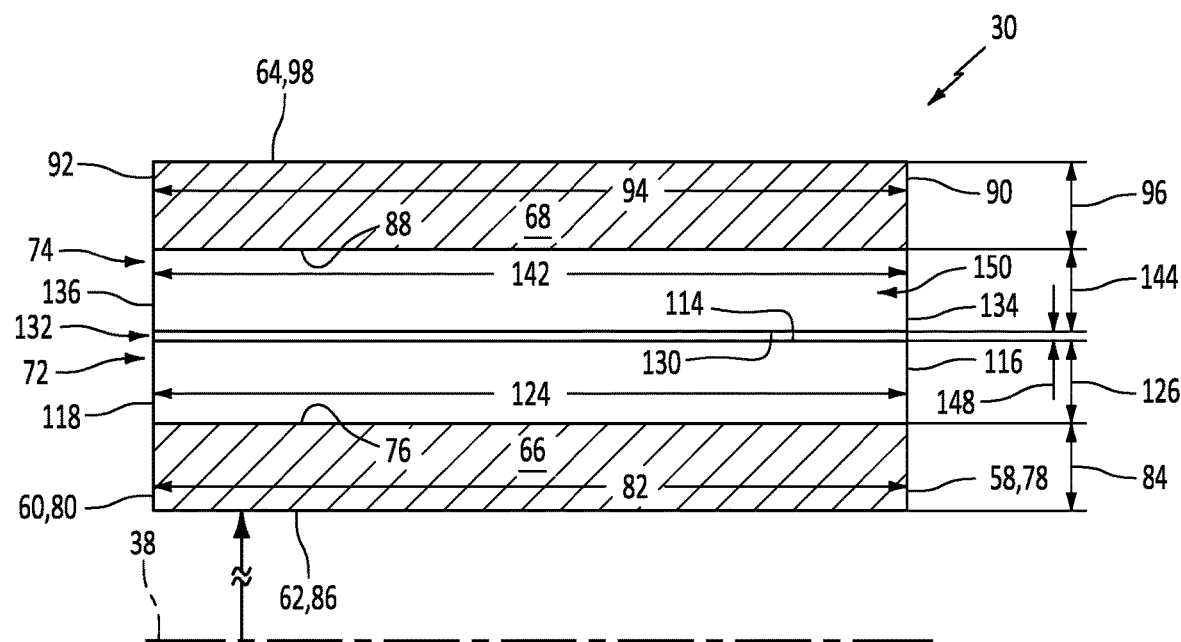
FIG. 2 is a sectional illustration of a portion of a flexible support at a first circumferential position.
Figure 3:
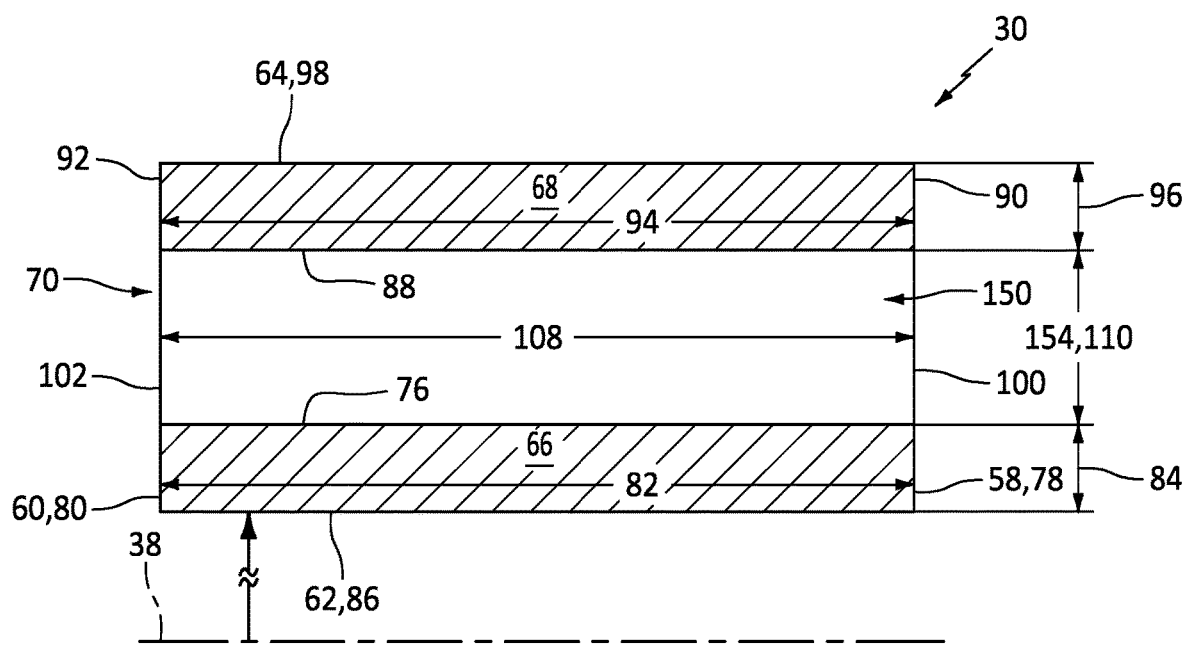
FIG. 3 is a sectional illustration of a portion of the flexible support at a second circumferential position.

Referring to FIGS. 2 and 3, the flexible support 30 extends axially along the axis 38 between and to a first side 58 of the flexible support 30 and a second side 60 of the flexible support 30. The flexible support 30 extends radially from a radial inner side 62 of the flexible support 30 to a radial outer side 64 of the flexible support 30. The flexible support 30 of FIG. 4 extends circumferentially about (e.g., completely around) the axis 38, which provides the flexible support 30 with, for example, a full-hoop (e.g., annular) geometry. The flexible support 30 of FIG. 4 includes a radial inner ring 66, a radial outer ring 68, a plurality of bridges 70, a plurality of inner ribs 72 and a plurality of outer ribs 74.

The support inner ring 66 is disposed at the support inner side 62. The support inner ring 66 of FIG. 4, for example, extends radially between and to a radial outer side 76 of the support inner ring 66 and the support inner side 62. Referring to FIGS. 2 and 3, the support inner ring 66 extends axially along the axis 38 between and to opposing axial sides 78 and 80 of the support inner ring 66. The inner ring first side 78 of FIGS. 2 and 3 is aligned with the support first side 58. The inner ring second side 80 of FIGS. 2 and 3 is aligned with the support second side 60. The support inner ring 66 of FIG. 4 extends circumferentially about (e.g., completely around) the axis 38, which provides the support inner ring 66 with, for example, a full-hoop (e.g., tubular) geometry.

The support inner ring 66 of FIGS. 2 and 3 has an axial width 82 and a radial thickness 84. The inner ring width 82 is measured axially along the axis 38 from the inner ring first side 78 to the inner ring second side 80. This inner ring width 82 may be uniform (constant) as the support inner ring 66 extends circumferentially about the axis 38. The inner ring thickness 84 is measured radially from the support inner side 62 to the inner ring outer side 76. This inner ring thickness 84 may be uniform as the support inner ring 66 extends circumferentially about the axis 38.

The flexible support 30 and its support inner ring 66 of FIGS. 2 and 3 include an interior support surface 86 disposed at the support inner side 62. The interior support surface 86 may have a regular cylindrical geometry which extends axially from (or near) the inner ring first side 78 to (or near) the inner ring second side 80.

The support outer ring 68 is disposed at the support outer side 64. The support outer ring 68 of FIGS. 2 and 3, for example, extends radially between and to a radial inner side 88 of the support outer ring 68 and the support outer side 64. The support outer ring 68 extends axially along the axis 38 between and to opposing axial sides 90 and 92 of the support outer ring 68. The outer ring first side 90 of FIGS. 2 and 3 is aligned with the support first side 58 and/or the inner ring first side 78. The outer ring second side 92 of FIGS. 2 and 3 is aligned with the support second side 60 and/or the inner ring second side 80. The support outer ring 68 of FIG. 4 extends circumferentially about (e.g., completely around) the axis 38, which provides the support outer ring 68 with, for example, a full-hoop (e.g., tubular) geometry.

The support outer ring 68 of FIGS. 2 and 3 has an axial width 94 and a radial thickness 96. The outer ring width 94 is measured axially along the axis 38 from the outer ring first side 90 to the outer ring second side 92. This outer ring width 94 may be uniform (constant) as the support outer ring 68 extends circumferentially about the axis 38. The outer ring width 94 of FIGS. 2 and 3 is equal to the inner ring width 82. The outer ring thickness 96 is measured radially from the support outer side 64 to the outer ring inner side 88. This outer ring thickness 96 may be uniform as the support outer ring 68 extends circumferentially about the axis 38. The outer ring thickness 96 of FIGS. 2 and 3 is equal to the inner ring thickness 84. The present disclosure, however, is not limited to such exemplary dimensional relationships. It is contemplated, for example, the outer ring width 94 may alternatively be sized differently (e.g., greater) than the inner ring width 82 and/or the outer ring thickness 96 may be sized differently (e.g., greater) than the inner ring thickness 84 in other embodiments.

The flexible support 30 and its support outer ring 68 of FIGS. 2 and 3 include an exterior support surface 98 disposed at the support outer side 64. The exterior support surface 98 may have a regular cylindrical geometry which extends axially from (or near) the outer ring first side 90 to (or near) the outer ring second side 92.

Figure 4:
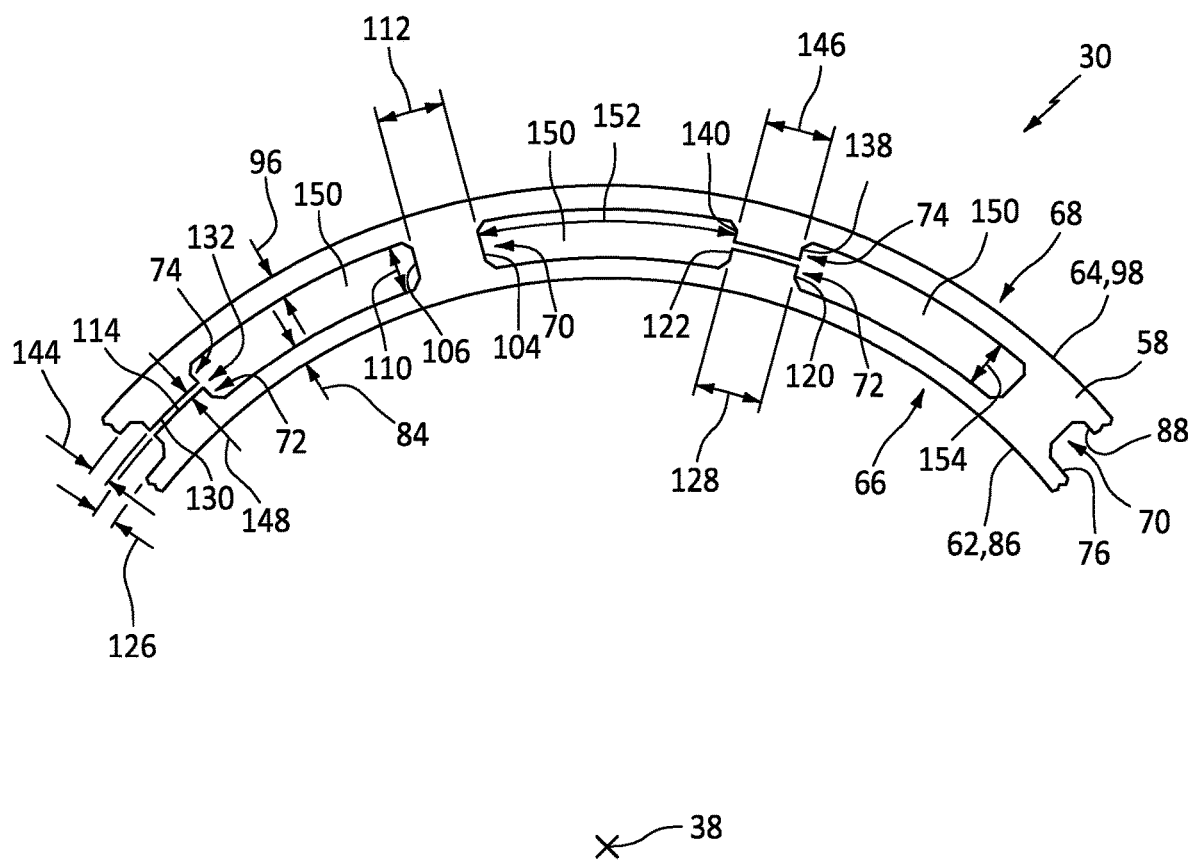
FIG. 4 is a side view illustration of a portion of the flexible support.

Referring to FIG. 4, the support bridges 70 are arranged (e.g., and equispaced) circumferentially about the axis 38 in an array; e.g., a circular array. This array of support bridges 70 is disposed radially between the support inner ring 66 and the support outer ring 68. Each support bridge 70 of FIG. 4, for example, is connected to (e.g., formed integral with) the support inner ring 66 and the support outer ring 68. Each support bridge 70 projects radially out from the support inner ring 66 at its inner ring outer side 76 to the support outer ring 68 at its outer ring inner side 88. Referring to FIG. 3, each support bridge 70 extends axially along the axis 38 between and to opposing axial sides 100 and 102 of the respective support bridge 70. The bridge first side 100 of FIG. 3 is axially aligned with the support first side 58, the inner ring first side 78 and/or the outer ring first side 90. The bridge second side 102 of FIG. 3 is axially aligned with the support second side 60, the inner ring second side 80 and/or the outer ring second side 92. Each support bridge 70 of FIG. 4 extends laterally (e.g., circumferentially about the axis 38 or tangentially) between opposing lateral sides 104 and 106 of the respective support bridge 70.

Each support bridge 70 of FIG. 3 has an axial width 108 and a radial height 110. The bridge width 108 is measured axially along the axis 38 from the bridge first side 100 to the bridge second side 102. The bridge width 108 of FIG. 3 is equal to the inner ring width 82 and/or the outer ring width 94. The bridge height 110 is measured radially from the support inner ring 66 at its inner ring outer side 76 to the support outer ring 68 at its outer ring inner side 88. The bridge height 110 of FIG. 3 is greater than the inner ring thickness 84 and/or the outer ring thickness 96. The bridge height 110 of FIG. 3 is less than the bridge width 108. Referring to FIG. 4, each support bridge 70 has a lateral thickness 112 measured laterally between its opposing lateral sides 104 and 106. The bridge thickness 112 of FIG. 4 is greater than the inner ring thickness 84, the outer ring thickness 96 and/or the bridge height 110. The bridge thickness 112 of FIG. 4 is less than the bridge width 108 of FIG. 3. The present disclosure, however, is not limited to such exemplary dimensional relationships. It is contemplated, for example, the bridge height 110 of FIG. 4 may alternatively be sized equal to or greater than the bridge thickness 112 in other embodiments.

The support inner ribs 72 are arranged (e.g., and equispaced) circumferentially about the axis 38 in an array; e.g., a circular array. This array of support inner ribs 72 is interspersed with the array of support bridges 70. Each of the support inner ribs 72 of FIG. 4, for example, is arranged circumferentially between a respective circumferentially neighboring (e.g., adjacent) pair of the support bridges 70. Similarly, each of the support bridges 70 of FIG. 4 is arranged circumferentially between a respective circumferentially neighboring pair of the support inner ribs 72.

The array of support inner ribs 72 is disposed radially between the support inner ring 66 and the support outer ring 68. Each support inner rib 72 of FIG. 4 is connected to (e.g., formed integral with) the support inner ring 66 and is disengaged (e.g., disconnected) from the support outer ring 68. Each support inner rib 72 of FIG. 2, for example, projects radially out from the support inner ring 66 at its inner ring outer side 76 to a radial outer distal end 114 of the respective support inner rib 72. Referring to FIG. 2, each support inner rib 72 extends axially along the axis 38 between and to opposing axial sides 116 and 118 of the respective support inner rib 72. The inner rib first side 116 of FIG. 2 is axially aligned with the support first side 58, the inner ring first side 78 and/or the outer ring first side 90. The inner rib second side 118 of FIG. 2 is axially aligned with the support second side 60, the inner ring second side 80 and/or the outer ring second side 92. Each support inner rib 72 of FIG. 4 extends laterally between opposing lateral sides 120 and 122 of the respective support inner rib 72.

Each support inner rib 72 of FIG. 2 has an axial width 124 and a radial height 126. The inner rib width 124 is measured axially along the axis 38 from the inner rib first side 116 to the inner rib second side 118. The inner rib width 124 of FIG. 2 is equal to the inner ring width 82 and/or the outer ring width 94. The inner rib height 126 is measured radially from the support inner ring 66 at its inner ring outer side 76 to the respective inner rib distal end 114. The inner rib height 126 may be equal to (or different than) the inner ring thickness 84 and/or the outer ring thickness 96. The inner rib height 126 of FIG. 2 is less than the inner rib width 124 and the bridge height 110 of FIG. 3. Referring to FIG. 4, each support inner rib 72 has a lateral thickness 128 measured laterally between its opposing lateral sides 120 and 122. The inner rib thickness 128 of FIG. 4 is greater than the inner ring thickness 84 and/or the outer ring thickness 96. The inner rib thickness 128 may be equal to or different than the bridge thickness 112. The inner rib thickness 128 of FIG. 4 is less than the inner rib width 124 of FIG. 2. The present disclosure, however, is not limited to such exemplary dimensional relationships.

The support outer ribs 74 are arranged (e.g., and equispaced) circumferentially about the axis 38 in an array; e.g., a circular array. This array of support outer ribs 74 is interspersed with the array of support bridges 70. Each of the support outer ribs 74 of FIG. 4, for example, is arranged circumferentially between a respective circumferentially neighboring pair of the support bridges 70. Similarly, each of the support bridges 70 of FIG. 4 is arranged circumferentially between a respective circumferentially neighboring pair of the support outer ribs 74. Each of the support outer ribs 74 of FIG. 4 may also be circumferentially aligned with a respective one of the support inner ribs 72. Similarly, each of the support inner ribs 72 of FIG. 4 may be circumferentially aligned with a respective one of the support outer ribs 74.

The array of support outer ribs 74 is disposed radially between the support inner ring 66 and the support outer ring 68. Each support outer rib 74 of FIG. 4 is connected to (e.g., formed integral with) the support outer ring 68 and is disengaged (e.g., disconnected) from the support inner ring 66 as well as the respective circumferentially aligned support inner rib 72. Each support outer rib 74 of FIG. 2, for example, projects radially out from the support outer ring 68 at its outer ring inner side 88 to a radial inner distal end 130 of the respective support outer rib 74. This outer rib distal end 130 is radially spaced/separated from the opposite and circumferentially aligned inner rib distal end 114 by a radial gap 132; an empty air gap. Each support outer rib 74 extends axially along the axis 38 between and to opposing axial sides 134 and 136 of the respective support outer rib 74. The outer rib first side 134 of FIG. 2 is axially aligned with the support first side 58, the inner ring first side 78 and/or the outer ring first side 90. The outer rib second side 136 of FIG. 2 is axially aligned with the support second side 60, the inner ring second side 80 and/or the outer ring second side 92. Each support outer rib 74 of FIG. 4 extends laterally between opposing lateral sides 138 and 140 of the respective support outer rib 74.

Each support outer rib 74 of FIG. 2 has an axial width 142 and a radial height 144. The outer rib width 142 is measured axially along the axis 38 from the outer rib first side 134 to the outer rib second side 136. The outer rib width 142 of FIG. 2 is equal to the inner ring width 82, the outer ring width 94 and/or the inner rib width 124. The outer rib height 144 is measured radially from the support outer ring 68 at its outer ring inner side 88 to the respective outer rib distal end 130. The outer rib height 144 may be equal to (or different than) the inner ring thickness 84, the outer ring thickness 96 and/or the inner rib height 126. The outer rib height 144 of FIG. 2 is less than the outer rib width 142 and the bridge height 110 of FIG. 3. Referring to FIG. 4, each support outer rib 74 has a lateral thickness 146 measured laterally between its opposing lateral sides 138 and 140. The outer rib thickness 146 of FIG. 4 is greater than the inner ring thickness 84 and/or the outer ring thickness 96. The outer rib thickness 146 may be equal to or different than the bridge thickness 112 and/or the inner rib thickness 128. The outer rib thickness 146 of FIG. 4 is less than the outer rib width 142 of FIG. 2. The radial gap 132 of FIG. 4 has a radial height 148 measured from the respective support inner rib 72 at its inner rib distal end 114 to the respective support outer rib 74 at its outer rib distal end 130. The gap height 148 of FIG. 4 is less than the inner ring thickness 84, the outer ring thickness 96, the inner rib height 126, the outer rib height 144, the inner rib thickness 128 and/or the outer rib thickness 146. The present disclosure, however, is not limited to such exemplary dimensional relationships.

With the foregoing arrangement of elements 66, 68, 70, 72 and 74, the flexible support 30 is formed with a plurality of ports 150 arranged (e.g., and equispaced) circumferentially about the axis 38. Each of these ports 150 is formed by and extends circumferentially about the axis 38 between a respective set of circumferentially aligned support ribs 72 and 74 and its respective circumferentially neighboring support bridge 70. Each port 150 is formed by and extends radially from the support inner ring 66 at its inner ring outer side 76 to the support outer ring 68 at its outer ring inner side 88. Referring to FIGS. 2 and 3, each port 150 extends axially along the axis 38 through the flexible support 30 from the support first side 58 to the support second side 60.

Each port 150 of FIG. 4 has a circumferential width 152 and a radial height 154. The port width 152 is measured circumferentially about the axis 38 from the respective set of circumferentially aligned support ribs 72 and 74 and its respective circumferentially neighboring support bridge 70. The port width 152 of FIG. 4 is greater than the inner ring thickness 84, the outer ring thickness 96, the bridge thickness 112, the bridge height 110, the inner rib thickness 128 and/or the outer rib thickness 146. The port height 154 is measured radially from the support inner ring 66 at its inner ring outer side 76 to the support outer ring 68 at its outer ring inner side 88. The port height 154 of FIG. 4 may be equal to the bridge height 110 and/or a sum of the inner rib height 126, the outer rib height 144 and the gap height 148. The present disclosure, however, is not limited to such exemplary dimensional relationships.

Referring to FIG. 1, the flexible support 30 mounts (e.g., fixedly attaches) the bearing 28 and its outer race 54 to the stationary structure 22 and its outer mounting land 34. The support inner ring 66 of FIG. 1, for example, extends axially along (e.g., axially overlaps) and circumferentially around (e.g., circumscribes) the bearing 28 and its outer race 54. The support inner ring 66 and its interior support surface 86 further radially engage (e.g., radially contact, abut radially against, etc.) the bearing 28 and its outer race 54. Here, the outer race 54 is attached to the support inner ring 66 by an interference fit at a radial interface between the outer race 54 and the support inner ring 66 at the support inner side 62. Similarly, the outer mounting land 34 extends axially along and circumferentially around the flexible support 30 and its support outer ring 68. The support outer ring 68 and its exterior support surface 98 further radially engage (e.g., radially contact, abut radially against, etc.) the stationary structure 22 and its outer mounting land 34. Here, the support outer ring 68 is attached to the outer mounting land 34 by an interference fit at a radial interface between the support outer ring 68 at its support outer side 64 and the outer mounting land 34 and its land inner side 40. Of course, it is contemplated the outer race 54 may be attached to the support inner ring 66 and/or the support outer ring 68 may be attached to the outer mounting land 34 using various other attachment techniques; e.g., a retention ring, one or more fasteners (e.g., bolts), etc. Moreover, it is contemplated the support inner ring 66 may be used as an outer race of the bearing 28, and the outer race 54 may be omitted.

With the foregoing arrangement, the flexible support 30 is configured to accommodate (e.g., slight) radial movement between the rotating structure 24 and the stationary structure 22 during aircraft motor operation. A portion of the support inner ring 66 between each respective circumferentially neighboring pair of the support bridges 70 (see FIG. 4), for example, may operate as a flexible spring member. To facilitate a radial upward shift of the rotating structure 24 in FIG. 1, each inner ring portion may deform and bow radially outward such that the respective support inner rib 72 moves radially outward towards the respective support outer rib 74, thereby decreasing the gap height 148 of FIG. 2 or even contacting the respective support outer rib 74. To facilitate a radial downward shift of the rotating structure 24 in FIG. 1, each inner ring portion may deform and bow radially inwards such that the respective support inner rib 72 moves radially inwards away from the respective support outer rib 74, thereby increasing the gap height 148 of FIG. 2. Of course, opposite deformation of the support inner ring 66 may occur at a diametrically opposing side of the flexible support 30 to the section shown in FIG. 1. Dimensions of the flexible support 30 may be selected to tune a spring rate of the support inner ring deformation.

Figure 5:
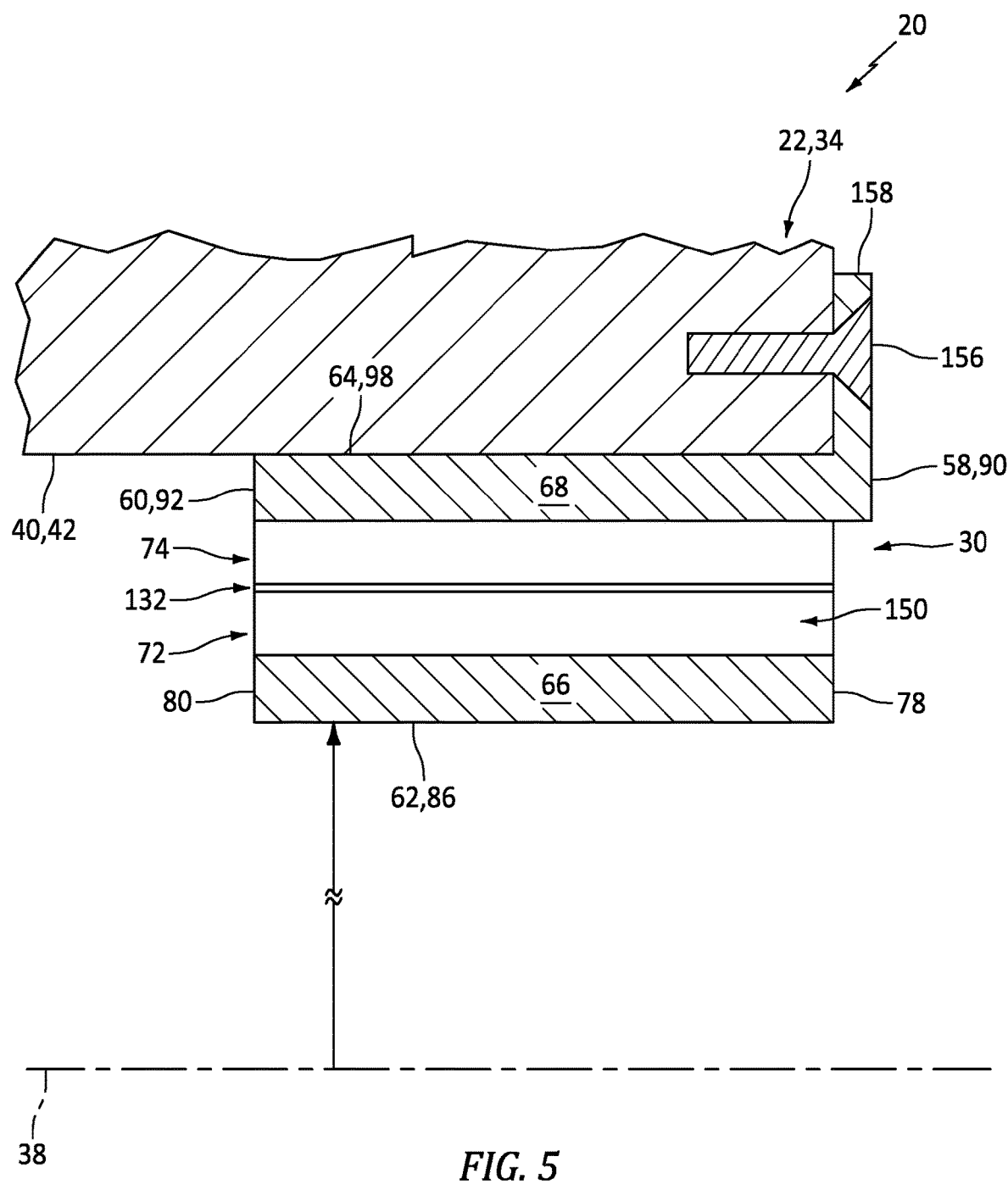
FIG. 5 is a sectional illustration of a portion of the assembly with another flexible support mounting arrangement.

While the flexible support 30 is described above as being attached to the bearing 28 and the stationary structure 22 through interference fits, the present disclosure is not limited to such exemplary mounting techniques. For example, the flexible support 30 and its support outer ring 68 may also or alternatively be bonded (e.g., welded, brazed, etc.) to the stationary structure 22 and its outer mounting land 34. In another example, referring to FIG. 5, the flexible support 30 may also or alternatively be mechanically fastened to the stationary structure 22 and its outer mounting land 34 by one or more mechanical fasteners 156; e.g., bolts. A mounting flange 158, for example, may be connected to and project radially out from the support outer ring 68 at the support first side 58/the outer ring first side 90. This mounting flange 158 may abut axially against or otherwise axially engage the stationary structure 22 and its outer mounting land 34. The mounting flange 158 is attached to the stationary structure 22 and its outer mounting land 34 by the mechanical fasteners 156.

Figure 6:
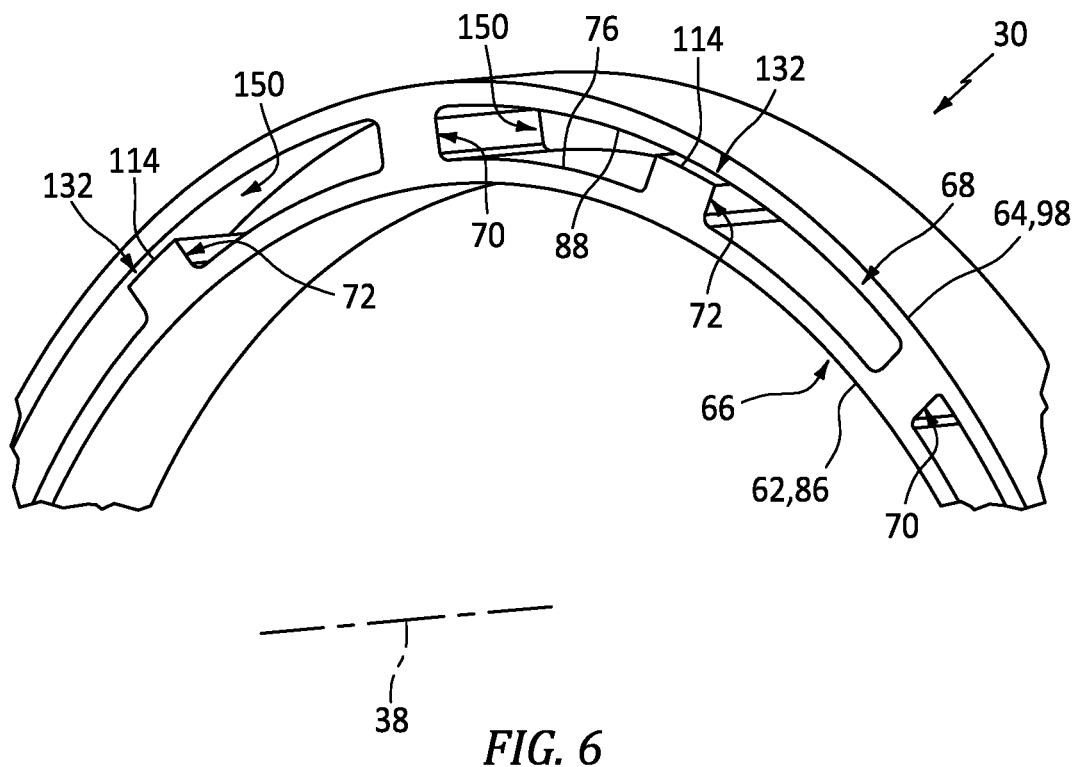
FIGS. 6 and 7 are partial perspective illustrations of the flexible support with other arrangements of support ribs.
Figure 7:
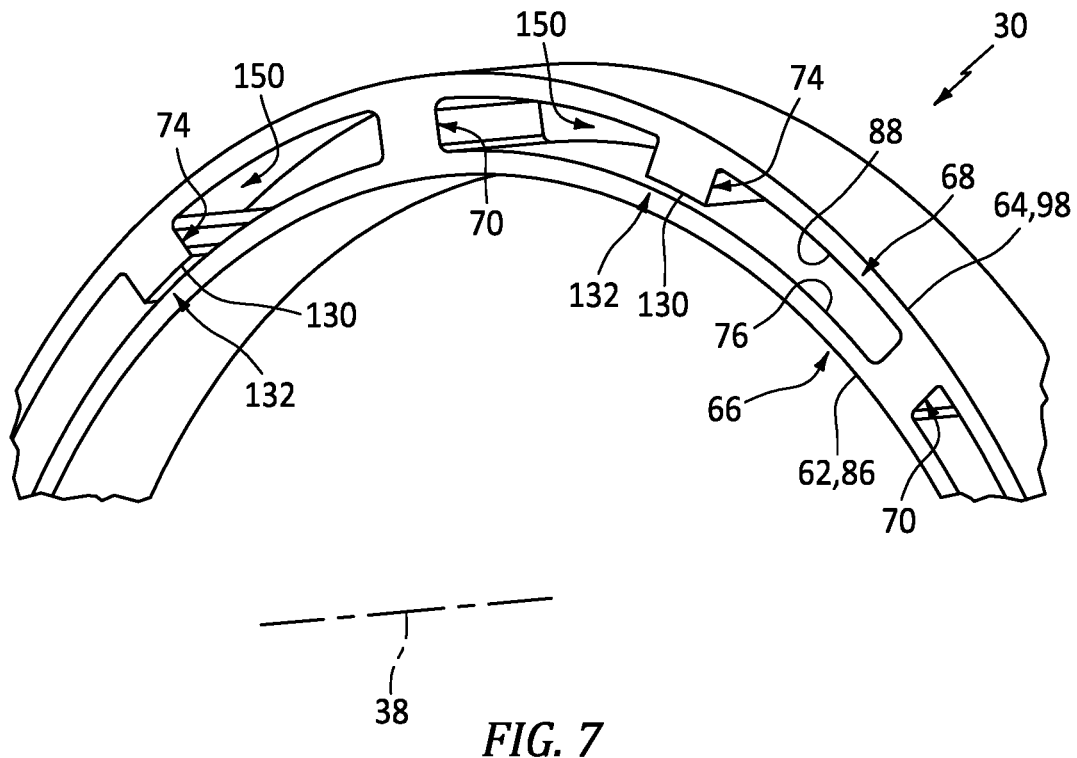

In some embodiments, referring to FIG. 4, the flexible support 30 may be configured with the circumferentially aligned support inner ribs 72 and support outer ribs 74. In other embodiments, referring to FIG. 6, one or more of the support outer ribs 74 (see FIG. 4) may be omitted. The flexible support 30 of FIG. 6, for example, is configured without any support outer ribs. Here, the radial gap 132 is formed by and extends radially between the respective support inner rib 72 at its inner rib distal end 114 and the support outer ring 68 at its outer ring inner side 88. In still other embodiments, referring to FIG. 7, one or more of the support inner ribs 72 (see FIG. 4) may be omitted. The flexible support 30 of FIG. 7, for example, is configured without any support inner ribs. Here, the radial gap 132 is formed by and extends radially between the respective support outer rib 74 at its outer rib distal end 130 and the support inner ring 66 at its inner ring outer side 76. Of course, in still other embodiments, it is contemplated the flexible support 30 may include a pattern of the support inner ribs 72 and the support outer ribs 74 where the inner and outer ribs 72 and 74 are circumferentially offset from one another.

In some embodiments, referring to FIG. 4, the flexible support 30 may include a single array of the support bridges 70, a single array of the support inner ribs 72 and/or a single set of the support outer ribs 74. In other embodiments, referring to FIG. 8, the flexible support 30 may include multiple arrays of the support bridges 70A and 70B (generally referred to as "70"), multiple arrays of the support inner ribs 72A and 72B (generally referred to as "72") and/or multiple arrays of the support outer ribs 74A and 74B

Figure 8:
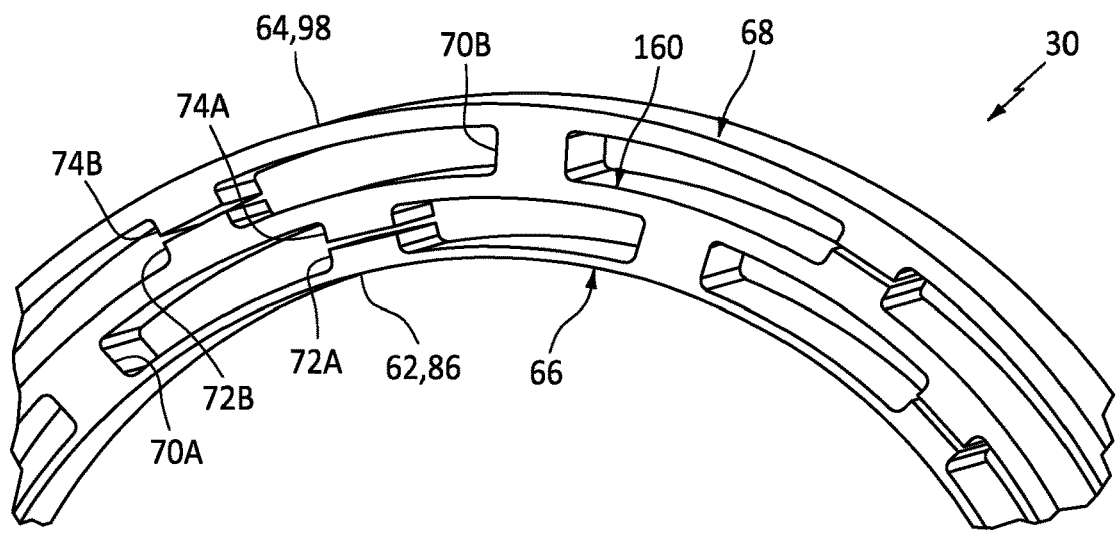
FIGS. 8 and 9 are partial perspective illustrations of the flexible support with multiple layers of support bridges and support ribs.

(generally referred to as "74"). The flexible support 30 of FIG. 8, for example, includes an intermediate ring 160 radially between the support inner ring 66 and the support outer ring 68. The support bridges 70A, the support inner ribs 72A and the support outer ribs 74A are arranged between the support inner ring 66 and the support intermediate ring 160. The support bridges 70B, the support inner ribs 72B and the support outer ribs 74B are arranged between the support outer ring 68 and the support intermediate ring 160. Each of the support bridges 70, the support inner ribs 72 and the support outer ribs 74 may be arranged in a similar manner as described above with respect to FIG. 4. Here, the inner support bridges 70A of FIG. 8 are circumferentially offset from the outer support bridges 70B. The inner support bridges 70A of FIG. 8 are also circumferentially offset from the sets of support ribs 72B and 74B. Note, while each layer of the multi-layer flexible support 30 of FIG. 8 is shown with circumferentially aligned support inner ribs 72 and support outer ribs 74, it is contemplated the inner layer and/or the outer layer may alternatively be configured with only the support inner ribs 72A, 72B or the support outer ribs 74A, 74B.

Figure 9:
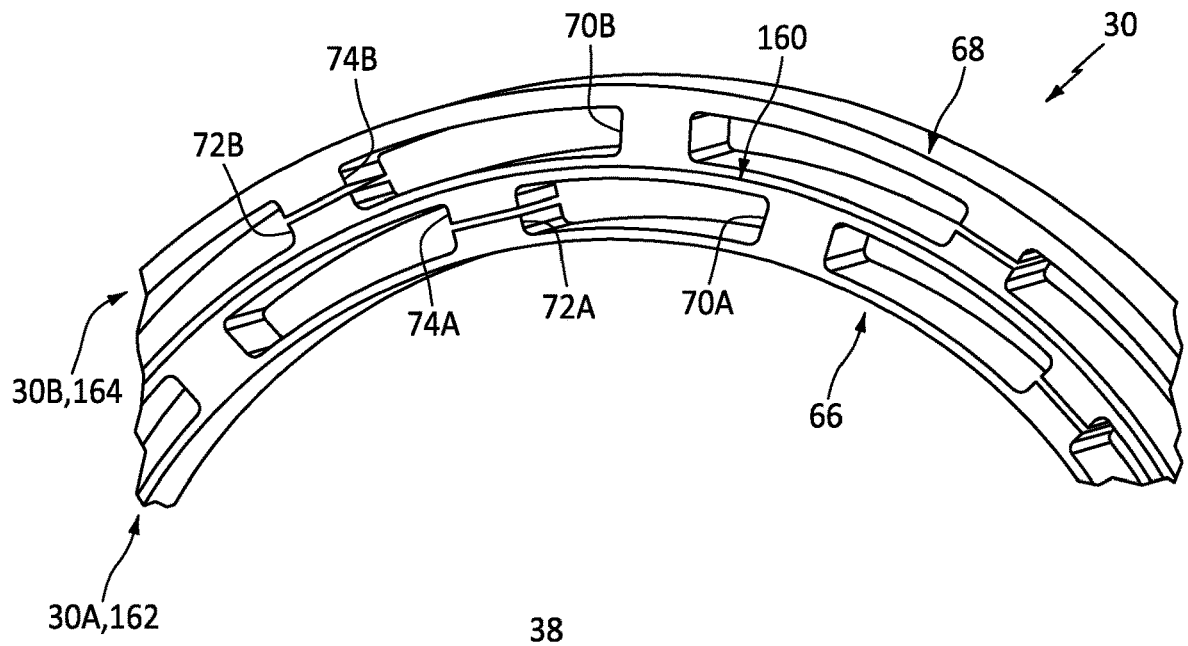

In some embodiments, referring to FIG. 8, the multi-layer flexible support 30 may be configured as a single unitary body. For example, the multi-layer flexible support 30 of FIG. 8 (like the flexible support 30 of FIG. 4) may be cast, machined, additively manufactured and/or otherwise formed from a single mass of material as a monolithic body. In other embodiments, referring to FIG. 9, the multi-layer flexible support 30 may be configured from multiple (e.g., coaxial and layered) segments 162 and 164. Two separate flexible supports 30A and 30B, for example, may be arranged together to form the single multi-layer flexible support 30, where each flexible support 30A, 30B may have a configuration similar to that described above with respect to the flexible support 30 in FIGS. 2-4 for example. The present disclosure, however, is not limited to any particular flexible support constructions or manufacturing techniques.

While the flexible support 30 is described above with one or two sets of elements 70, 72 and 74, the present disclosure is not limited thereto. It is contemplated, for example, the flexible support 30 may alternatively include three or even more sets of the elements 70, 72 and 74 in order to accommodate, for example, high loads.

Figure 10:
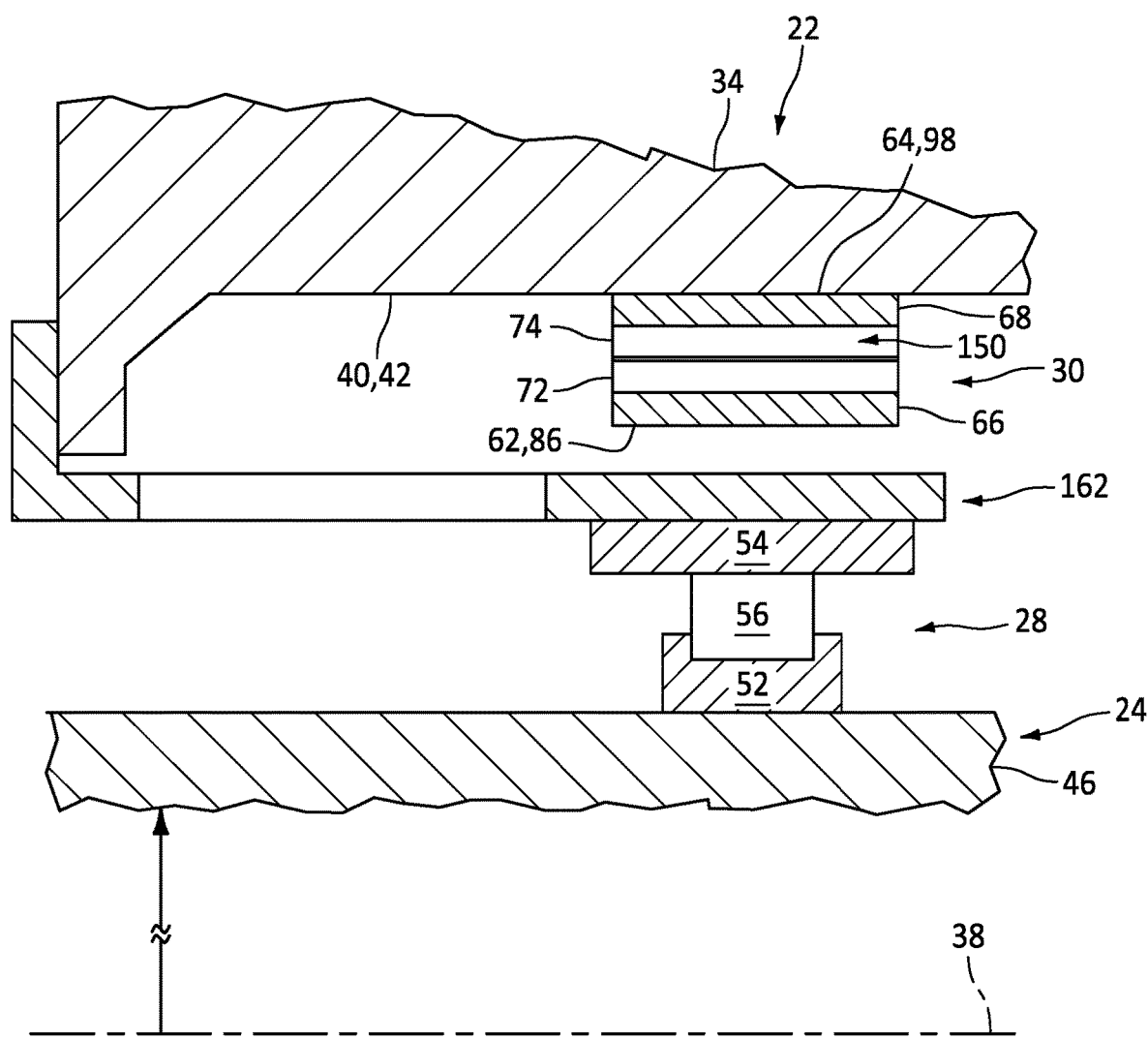
FIG. 10 is a sectional illustration of a portion of another assembly for the aircraft motor.

In some embodiments, referring to FIG. 1, the flexible support 30 may be configured as an insert radially between and mounting the bearing 28 and its outer race 54 to the stationary structure 22 and its outer mounting land 34. The flexible support 30 of the present disclosure, however, is not limited to such an exemplary flexible support configuration. For example, referring to FIG. 10, the flexible support 30 may alternatively be configured as a bump stop support for another flexible mount 162 for the bearing 28; e.g., a squirrel cage bearing mount. Here, the flexible support 30 and the flexible mount 162 are independently attached to the stationary structure 22. Moreover, the flexible support 30 is spaced radially outboard from, axially overlaps and circumscribes the flexible mount 162. With this arrangement, the flexible support 30 provides a progressive bump stop for the flexible mount 162 under certain conditions. Note, while the arrangement of FIG. 10 is shown with the single layer flexible support 30 for case of illustration, it is contemplated the arrangement of FIG. 10 may alternatively be arranged with a multi-layer flexible support.

In some embodiments, referring to FIG. 4, the flexible support 30 may include a common (e.g., an identical) number of the bridges 70 as the respective pairs of the inner ribs 72 and the outer ribs 74. In other embodiments, a number of bridges 70 may be different (e.g., greater or less) than a number of the pairs of the inner ribs 72 and the outer ribs 74. For example, two or more of the bridges 70 may be disposed between each circumferentially neighboring pair of the ribs 72, 74. In another example, two or more of the pairs of the ribs 72, 74 may be disposed between each circumferentially neighboring pair of the bridges 70.

In some embodiments, the gap height 148 between each respective pair of the inner ribs 72 and the outer ribs 74 may be uniform; e.g., identical. It is contemplated, however, the gap height 148 between different pairs of the inner ribs 72 and the outer ribs 74 may be different to accommodate, for example, carcass bending.

The aircraft motor of the present disclosure may be configured as or otherwise include a gas turbine engine. The gas turbine engine may be a geared gas turbine engine with a geartrain operatively coupling one or more shafts to one or more rotors in a fan section, a compressor section and/or any other engine section. Alternatively, the gas turbine engine may be configured without a geartrain as a direct-drive gas turbine engine. The gas turbine engine may include a single spool or multiple spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU). The present disclosure therefore is not limited to any particular types or configurations of gas turbine engines. Moreover, while the aircraft motor is described above as a gas turbine engine, it is contemplated the aircraft motor may alternatively be configured as or otherwise include another type of internal combustion (IC) engine such as, but not limited to, a rotary engine (e.g., a Wankel type engine) or a reciprocating piston engine, or even an electric motor.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft motor, comprising:
a bearing extending circumferentially around an axis;
a stationary structure circumscribing the bearing; and
a flexible support arranged radially between and radially engaging the bearing and the stationary structure, the flexible support including a first ring, a second ring, a third ring, a plurality of first bridges, a plurality of first ribs, a plurality of second bridges and a plurality of second ribs;
the second ring radially between the first ring and the third ring;
the plurality of first bridges arranged circumferentially about the axis, and each of the plurality of first bridges extending radially between and connected to the first ring and the second ring;
the plurality of first ribs arranged circumferentially about the axis and interspersed with the plurality of first bridges, each of the plurality of first ribs projecting radially out from the first ring towards the second ring, and each of the plurality of first ribs connected to the first ring and disengaged from the second ring;

the plurality of second bridges arranged circumferentially about the axis, each of the plurality of second bridges extending radially between and connected to the second ring and the third ring, and the plurality of second bridges circumferentially offset from the plurality of first bridges; and the plurality of second ribs arranged circumferentially about the axis and interspersed with the plurality of second bridges, each of the plurality of second ribs projecting radially out from the second ring towards the third ring, and each of the plurality of second ribs connected to the second ring and disengaged from the third ring.

2. The assembly of claim 1, wherein
the first ring is an inner ring; and
the second ring is an outer ring which circumscribes the inner ring.

3. The assembly of claim 1, wherein the first ring circumscribes the second ring, and the second ring circumscribes the third ring.

4. The assembly of claim 1, wherein the flexible support further includes a plurality of third ribs, each of the plurality of third ribs is connected to and projects radially out from the second ring, each of the plurality of third ribs is circumferentially aligned with a respective one of the plurality of first ribs, and each of the plurality of third ribs is separated from the respective one of the plurality of first ribs by a respective radial gap.

5. The assembly of claim 4, wherein
a first of the plurality of first ribs is circumferentially aligned with a first of the plurality of third ribs; and
a radial height of the first of the plurality of first ribs is equal to a radial height of the first of the plurality of third ribs.

6. The assembly of claim 4, wherein
a first of the plurality of first ribs is circumferentially aligned with a first of the plurality of third ribs; and
a radial height of the respective radial gap radially between and formed by the first of the plurality of first ribs and the first of the plurality of third ribs is less than at least one of a radial height of the first of the plurality of first ribs or a radial height of the first of the plurality of third ribs.

7. The assembly of claim 4, wherein
a first of the plurality of first ribs is circumferentially aligned with a first of the plurality of third ribs; and
a radial height of the respective radial gap radially between and formed by the first of the plurality of first ribs and the first of the plurality of third ribs is less than at least one of a lateral thickness of the first of the plurality of first ribs or a lateral thickness of the first of the plurality of third ribs.

8. The assembly of claim 1, wherein each of the plurality of first ribs is separated from the second ring by a respective radial gap.

9. The assembly of claim 8, wherein a radial height of the respective radial gap radially between and formed by a first of the plurality of first ribs and the second ring is less than at least one of
a radial height of the first of the plurality of first ribs; or
a lateral thickness of the first of the plurality of first ribs.

10. The assembly of claim 1, wherein a radial height of a first of the plurality of first bridges is at least one of equal to or less than a lateral width of the first of the plurality of first bridges; or
greater than an axial width of the first of the plurality of first bridges.

11. The assembly of claim 1, wherein a radial height of a first of the plurality of first bridges is greater than at least one of a radial thickness of the first ring or a radial thickness of the second ring.

12. The assembly of claim 1, wherein the flexible support extends axially between a support first side and a support second side, and at least one of
the first ring, the second ring, each of the plurality of first bridges and each of the plurality of first ribs projects axially to the support first side; or
the first ring, the second ring, each of the plurality of first bridges and each of the plurality of first ribs projects axially to the support second side.

13. The assembly of claim 1, wherein
the bearing comprises a rolling element bearing with an outer race; and
one of the first ring or the third ring circumscribes and radially engages the outer race.

14. The assembly of claim 1, wherein the flexible support is attached to the stationary structure through an interference fit at a radial interface between the stationary structure and one of the first ring or the third ring.

15. The assembly of claim 1, wherein the flexible support is attached to the stationary structure through a bonded connection between the stationary structure and one of the first ring or the third ring.

16. The assembly of claim 1, wherein the flexible support is attached to the stationary structure with one or more fasteners.

17. An assembly for an aircraft motor, comprising:
a bearing extending circumferentially around an axis;
a stationary structure circumscribing the bearing; and
a flexible support arranged radially between and radially engaging the bearing and the stationary structure, the flexible support including a first ring, a second ring, a third ring, a plurality of first bridges, a plurality of first ribs, a plurality of second bridges and a plurality of second ribs;

the second ring radially between the first ring and the third ring;

the plurality of first bridges arranged circumferentially about the axis, and each of the plurality of first bridges extending radially between and connected to the first ring and the second ring;

the plurality of first ribs arranged circumferentially about the axis and interspersed with the plurality of first bridges, each of the plurality of first ribs projecting radially out from the second ring towards the first ring, and each of the plurality of first ribs connected to the second ring and disengaged from the first ring;

the plurality of second bridges arranged circumferentially about the axis, each of the plurality of second bridges extending radially between and connected to the second ring and the third ring, and the plurality of second bridges circumferentially offset from the plurality of first bridges; and the plurality of second ribs arranged circumferentially about the axis and interspersed with the plurality of second bridges, wherein one of
each of the plurality of second ribs projects radially out from the second ring towards the third ring, and each of the plurality of second ribs is connected to the second ring and is disengaged from the third ring; or each of the plurality of second ribs projects radially out from the third ring towards the second ring, and each of the plurality of second ribs is connected to the third ring and is disengaged from the second ring.

* * * * *